(12) United States Patent
Tamari et al.

(10) Patent No.: US 10,445,954 B2
(45) Date of Patent: *Oct. 15, 2019

(54) DRIVE EVENT CAPTURING BASED ON GEOLOCATION

(71) Applicant: Lytx, Inc., San Diego, CA (US)

(72) Inventors: Roni Tamari, San Diego, CA (US); Joshua Donald Botnen, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 15/047,498

(22) Filed: Feb. 18, 2016

(65) Prior Publication Data

US 2016/0335814 A1 Nov. 17, 2016

Related U.S. Application Data

(63) Continuation of application No. 13/271,417, filed on Oct. 12, 2011, now Pat. No. 9,298,575.

(51) Int. Cl.
| | | |
|---|---|---|
| *G06F 11/30* | (2006.01) | |
| *G07C 5/08* | (2006.01) | |
| *G08G 1/123* | (2006.01) | |
| *G08G 1/00* | (2006.01) | |
| *G08G 1/01* | (2006.01) | |

(52) U.S. Cl.
CPC .......... *G07C 5/085* (2013.01); *G06F 11/3013* (2013.01); *G06F 11/3058* (2013.01); *G06F 11/3072* (2013.01); *G08G 1/0112* (2013.01); *G08G 1/0129* (2013.01); *G08G 1/0133* (2013.01); *G08G 1/0141* (2013.01); *G08G 1/123* (2013.01); *G08G 1/20* (2013.01)

(58) Field of Classification Search
None
See application file for complete search history.

(56) References Cited

U.S. PATENT DOCUMENTS

| | | |
|---|---|---|
| 6,133,947 A | 10/2000 | Mikuni |
| 7,205,888 B2 | 4/2007 | Isaji |
| 7,872,593 B1 | 1/2011 | Rauscher et al. |
| 8,260,489 B2 | 9/2012 | Nielsen et al. |
| 8,301,374 B2 | 10/2012 | Surampudi et al. |
| 8,428,307 B2 | 4/2013 | Bradai et al. |
| 8,699,800 B1 | 4/2014 | Chau |
| 8,849,501 B2 | 9/2014 | Cook |
| 8,854,199 B2 | 10/2014 | Cook |
| 9,298,575 B2 * | 3/2016 | Tamari ............... G06F 11/3013 |
| 9,344,683 B1 | 5/2016 | Nemat-Nasser |
| 2002/0008758 A1 | 1/2002 | Broemmelsiek et al. |
| 2003/0055557 A1 * | 3/2003 | Dutta ................. B60R 25/1001 701/532 |
| 2004/0236474 A1 * | 11/2004 | Chowdhary ....... G06Q 30/0601 701/1 |
| 2004/0236475 A1 | 11/2004 | Chowdhary |

(Continued)

*Primary Examiner* — Genna M Mott
(74) *Attorney, Agent, or Firm* — Van Pelt, Yi & James LLP

(57) ABSTRACT

A system for drive event capturing based on geolocation comprises an interface and a processor. The interface receives driving data from one or more onboard sensors of a vehicle, and the processor is configured to capturing a drive event based on a geolocation of the vehicle. The capturing of the drive event includes causing storage of driving data associated with the drive event.

17 Claims, 10 Drawing Sheets

(56) References Cited

U.S. PATENT DOCUMENTS

| | | |
|---|---|---|
| 2004/0236476 A1 | 11/2004 | Chowdhary |
| 2004/0236596 A1 | 11/2004 | Chowdhary |
| 2005/0216186 A1 | 9/2005 | Dorfman et al. |
| 2007/0257781 A1* | 11/2007 | Denson ................. G07C 5/008 340/425.5 |
| 2008/0162027 A1 | 7/2008 | Murphy |
| 2008/0285886 A1 | 11/2008 | Allen |
| 2009/0009321 A1* | 1/2009 | McClellan ............. G08G 1/207 340/539.13 |
| 2009/0074249 A1 | 3/2009 | Moed et al. |
| 2009/0140887 A1 | 6/2009 | Breed et al. |
| 2009/0187300 A1 | 7/2009 | Everitt et al. |
| 2010/0033571 A1 | 2/2010 | Fujita et al. |
| 2010/0191411 A1* | 7/2010 | Cook .................... G07C 5/085 701/31.4 |
| 2010/0208070 A2 | 8/2010 | Haynes et al. |
| 2010/0211270 A1 | 8/2010 | Chin et al. |
| 2010/0250045 A1 | 9/2010 | Miura |
| 2010/0256858 A1 | 10/2010 | Yago et al. |
| 2010/0256863 A1 | 10/2010 | Nielsen et al. |
| 2010/0328009 A1 | 12/2010 | Tawa |
| 2011/0095908 A1 | 4/2011 | Nadeem et al. |
| 2013/0179198 A1 | 7/2013 | Bowne |

\* cited by examiner

DRIVE EVENT CAPTURING BASED ON GEOLOCATION

CROSS REFERENCE TO OTHER APPLICATIONS

This application is a continuation of U.S. patent application Ser. No. 13/271,417, now U.S. Pat. No. 9,298,575, entitled DRIVE EVENT CAPTURING BASED ON GEOLOCATION filed Oct. 12, 2011 which is incorporated herein by reference for all purposes.

BACKGROUND OF THE INVENTION

Tracking vehicular incidents or "drive events" is an important part of fleet management, it allows transportation companies to properly access and manage risks. Typically, onboard vehicle sensors are used to monitor vehicle operation and record drive events. Setting appropriate sensor sensitivities and drive event capturing criteria can help to ensure that valid drive events are captured without capturing invalid non-events, in this way resources are not wasted on storing, transmitting and analyzing non-event data. It is commonly known that different levels of risks are associated with driving in different environments, for example driving downhill may pose a different level of risk than driving on a flat land. However, this is not adequately reflected in the current drive event detection and risk assessment, particularly sensor sensitivity, drive event capturing criteria and risk assessment criteria are not adjusted based on road conditions or drive environments.

BRIEF DESCRIPTION OF THE DRAWINGS

Various embodiments of the invention are disclosed in the following detailed description and the accompanying drawings.

DETAILED DESCRIPTION

Figure 1:
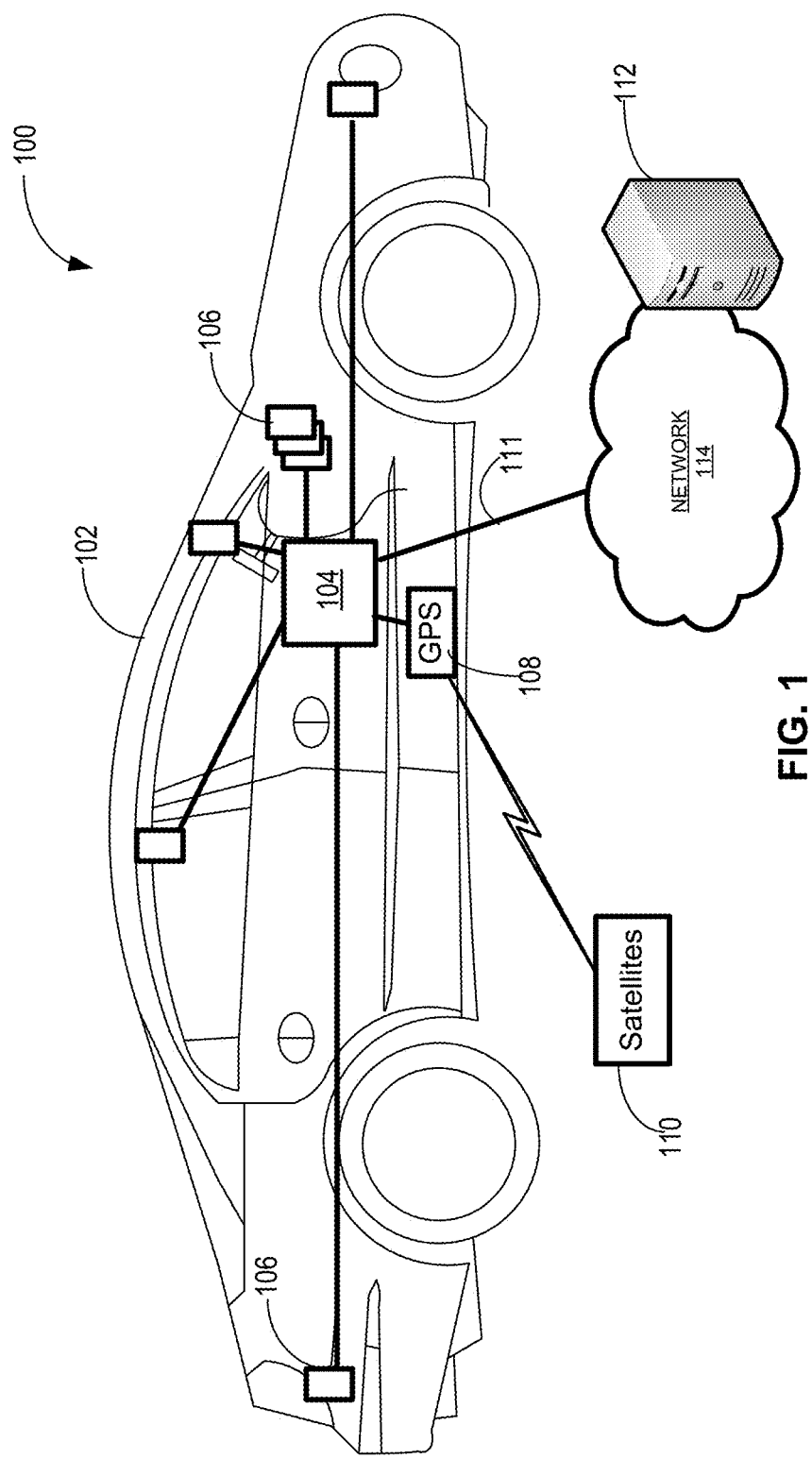
FIG. 1 is a block diagram illustrating an embodiment of a system for assessing performance of a driver.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for drive event capturing based on geolocation is disclosed. The system comprises an interface and a processor. The interface receives driving data from one or more onboard sensors of a vehicle, and the processor is configured to capturing a drive event based on a geolocation of the vehicle. The capturing of the drive event includes causing storage of driving data associated with the drive event. A memory is coupled to the processor and configured to provide the processor with instructions.

Techniques for assessing driver performance based on geolocation are disclosed. In one example, a drive event of a vehicle is detected based on the sensor data detected by onboard sensors and the geolocation of a vehicle. In various embodiments, capturing the drive event includes capturing pre-event data, during-event data, and post-event data. In various embodiments, capturing the drive event include adjusting the sensitivity of one or more onboard vehicle sensors, uploading of the drive event from a volatile memory buffer to the persistent storage, and/or uploading of the drive event to a server based on a geolocation based criteria, or any other appropriate activity regarding capturing a drive event. In some embodiments, captured drive events are assigned risk scores based on geolocation criteria.

FIG. 1 is a block diagram illustrating an embodiment of a system for assessing performance of a driver. In the example shown, vehicle 102 is equipped with an onboard drive event detector 104 for detecting vehicle drive events. Driving events are driving occurrences relating to safe and proper operation of vehicle. Drive events may comprise accidents, near-accidents, traffic law violations, company rule violations, driving occurrences that increase the risk of accidents or otherwise causing harm to the owner of the vehicle or driver's employer. A drive event may include one or more "basic" drive operations that characterize basic or elementary moves of driving. In various embodiments, the basic drive operations of a drive event may be time sequenced. For example, a lane change drive event may be a combination of lateral acceleration followed by lateral deceleration during a period of forward motion. Other examples of simple drive operations include start events where a vehicle starts to move from a stopped position, stop events where a vehicle halt form a moving condition, right cornering, left cornering, etc. In various embodiments, a drive event may include two or more drive operations overlapping in time. For example, the drive event of accelerating out of stop includes accelerating and start from a stop position. The drive event of changing lanes while speeding includes time overlapped lateral acceleration followed by lateral deceleration during the period of forward motion.

Drive event detector 104 includes one or more computer processors that are capable of executing computer instructions for carrying out various functions of drive event detector 104. It additionally includes one or more data stores for storing computer instructions, raw sensor data, derived sensor data (metadata), and/or other drive event related data. Drive event detector 104 further includes one or more communication interfaces for communicating with one or more onboard sensors 106 via various communication links 111, GPS (the global positioning system receiver) 108 and with remote server 112 via network 114. Drive event detector 104 is communicatively linked to one or more onboard sensors 106. In various embodiments, onboard sensors comprise one or more of the following: an image capturing device (e.g., video camera and still camera), GPS receiver 108 for receiving geolocation data from satellites 110, a cellular tracking location receiver to receive geolocation data, or any other appropriate sensors. It is possible that one or more onboard sensors of onboard sensors 106 (e.g., GPS receiver, accelerometer, camera, etc.) are physically incorporated into drive event detector 104. Drive event detector 104 is communicatively linked to remote server 112 via data network 114 and configured to receive and/or transmit data from remote server 112. In various embodiments, network 114 comprises one or more of the following: a cellular network, a wifi network, a Wimax™ network, or any other appropriate network.

In various embodiments, onboard sensors 106 are configured to monitor the driver, vehicle operation, and/or various environmental parameters, or any other appropriate people, operation, or parameter. In some embodiments, the monitoring is carried out in a continuous fashion while the vehicle is in operation. In various embodiments, circuitries, processors and/or communications interfaces are included in onboard sensors 106 for executing computer instructions for carrying out various functions such as capturing, storing, processing, and/or transmitting sensor data. For examples, a sensor on/off circuitry is included to turn on/off the sensor, a data capture circuitry is included to capture sensor data, a low-pass filter circuitry is included to filter out high frequency noises, and a communications interface circuitry is included to transmit sensor data to a remote server. In various embodiments, the function(s) of a sensor is/are performed automatically by the sensor, carried out in response to external commands issued, for example by event detector 104, or at any other appropriate time or in response to any other appropriate trigger.

In various embodiments, one or more data stores are included in or associated with one or more onboard sensors 106 for storing computer instructions and raw or processed sensor data. The data stores may include internal or external, fixed or removable, persistent and/or volatile memory. In various embodiments, in order to monitor and record sensor data continuously, a flash buffer memory can be included in an onboard vehicle sensor to continuously store the detected sensor data. Sensor data in the flash memory is continuously written and overwritten in a first-in-first-out continuous loop.

The communication interfaces of drive event detector 104 and associated links can include wired and/or wireless (short range or long range), direct and/or indirect communication interfaces and links for interfacing with components that are internal and/or external of the driver performance analysis systems. The communication interfaces and associated links can be wired and/or wireless communication interfaces and links, direct and/or indirect wireless communication interfaces and links. In various embodiments, direct wired interfaces comprise a USB cable, a firewire cable, an RS-232 cable, a vehicle bus interface (e.g., on-board diagnostics (OBD) interface), global positioning system (GPS) interface, or any other appropriate interface. In various embodiments, direct wireless interfaces comprise an infrared, a Bluetooth™, ZigBee™, or an IEEE 802.11 point-to-point, a WiMAX™, satellite, a cellular interface, or any other appropriate interface. In various embodiments, indirect wired interfaces comprise a packet switched or circuit switched network connection interface configured for conveyance of data traffic. An Ethernet network connection is an example of a packet switched indirect wired interface and a dial up modem connection is an example of a circuit switched indirect wired interface. In various embodiments, network 114 includes wired and/or wireless networks such as wired or wireless phone network, local area network (LAN), wide area network (WAN), or any other appropriate networks.

Drive event detector 104 is configured to receive sensor data from one or more onboard sensors and receive other information from other external source(s) (e.g., satellite GPS location data, weather information, and/or road map) via the various communications interfaces. For example, still or moving images from various viewing perspectives, speed, acceleration and direction of the vehicle, the geolocation of the vehicle, environmental temperature and moisture level may be received from various onboard sensors. The received sensor data may be analyzed to determine whether a potential drive event or an actual drive event has occurred. The potential drive event or drive event may be detected by comparing the received sensor data with predefined threshold(s) and/or with predefined drive event profiles. In various embodiments, drive event detection involves determining whether a captured potential drive event is a non-event by comparing it with various non-event profiles. The non-event profiles are characteristics of captured drive events that are found to be invalid drive events. For example, non-event profiles include a bumpy road profile (e.g., sensor readings characteristic of driving a bumpy road—for example, vertical and horizontal accelerations, slow speed, residential area, etc.), a road entry profile (e.g., sensor readings characteristic of entering a road—for example, vertical acceleration, slow speed, transition onto a road area over a dip, etc.), or any other appropriate circumstance comprising a normal driving sequence. In other words, they are profiles of false positive drive events. Examples of non-events captured for collisions include, for example, crossing over a speed bump in a parking garage. In various embodiments, this is determined by: 1) initially viewing a video, having the geolocation manually tagged as a "speed bump," or having the location on a list of "speed bumps;" 2) once a geolocation is identified as a "speed bump", then a pattern associated with a "speed bump" is expected in the accelerometer/gyroscope at the geolocation. In various embodiments, dips in the road, railroad crossings, unpaved roads are identified by their geolocations. In the event that the sensor readings (e.g., associated with a current driving profile) differ from the expected non-event profile for a given location, then the system identifies it as an actual driving event or potential driving event. In various embodiments, examples of triggers that are non-events comprise pot holes, unpaved roads, rail road tracks, turning hard in a large vehicle, rocking an unloaded tractor trailer, waste truck throwing a trash bin into the vehicle hard, jack rabbit start, vehicle maintenance, defensive driving/evasive maneuver, or any other appropriate trigger for a non-event.

When a potential drive event or actual drive event is detected, drive event detector 104 is configured to cause the drive event data to be captured by, for example, instructing one or more onboard sensors 106 to store or to upload drive event data to drive event detector 104. This may involve storing or uploading certain amount of pre-event data, during-event data, and certain amount of post-event data to local or remote data storage. Capturing of pre-event data is enabled by the use of flash memory that records sensor data in a continuous loop. In various embodiments, a captured drive event is organized in a single file, folder or directory or in any other appropriate manner for easy access and demarcation so that the data relating to a particular drive event are easily recognized as such and can be accessed together and compared with ease. In some embodiments, the data from different sensors may be time-synchronized so that data from different sensors and/or sources for a single drive event data are correlated according to a time scale.

In some embodiments, drive event detector 104 is configured to perform various other types of analyses of the captured drive event data. Since the computation capacity of drive event detector 104 may be limited, such analyses may be preliminary analyses and less robust or complex than those that can be performed on remote server 112 that has more computation power. Nonetheless, such analyses done early in drive event capture and analysis process at drive event detector 104 may help to minimize storing, transmitting, processing unnecessary drive event related data. In one example, drive event detector 104 is configured to identify the best images (e.g., clearest with the right facial orientation) of a driver from various captured images, so that only the best images are stored and/or transmitted to remote server 112 for storage or analysis. In this way, valuable bandwidth for transmitting data is not wasted (or paid for). In another example, drive event detector 104 is configured to determine or classify (e.g., preliminarily determine or classify) whether a captured potential drive event is an valid drive event that can be used to assess driver performance, a non-event that is not relevant to evaluating the driver or vehicle performance in an interested area, a repeat non-event that has been repeatedly captured and needs to be alerted to the driver so the driver can strive to avoid it in the future by for example modifying his/her driving behavior, or any other appropriate classification or determination. In some embodiments, drive event detector 104 is configured to create drive event records based on how the captured data is classified. In various embodiments, a more comprehensive drive event record is created for a valid drive event, an abbreviated drive event record is created for a non-event, and an even more abbreviated drive event record (termed avoidance record) is created for a repeat non-event. The use of abbreviated records and avoidance records minimize storage space requirements and transmission bandwidth requirements. The avoidance record can be sent to the driver to alert the driver so that he/she can use it as a basis to modify his/her behavior when driving. For example, a non-event is repeatedly captured at a garage for passing too quickly over a speed bump, an avoidance record is then created to alert the driver so the driver is warned/cause to be trained/alerted to slow down the vehicle when passing through the speed bump.

In some embodiments, drive event detector 104 is configured to identify basic drive operations and drive maneuvers including basic drive operations and drive maneuvers that may overlap in time. The basic drive operations and drive maneuvers are common building blocks for all drive events—for example, evaluating the g-forces of a maneuver combined with the speed during the time of the maneuver. In various embodiments, an operation or maneuver comprises acceleration, braking, cornering, left/right cornering, collisions, swerving, rough road, vehicle maintenance, or any other appropriate operation or maneuver. In some embodiments, drive event detector 104 is configured to determine whether a captured drive event is indeed a drive event of interest rather than a non-event by for example comparing the capture drive event data with a non-event profile. For example, when a driver passes a speed bump, the shock sense can cause a collision drive event to be captured, but in fact this is a not an event of interest that can be used to evaluate the performance of the driver and is thus considered a non-event. Analysis of the driving event profile using advanced machine learning techniques stored on drive event detector 104 can "learn" the g-force profile of a speed bump at a specific geo-location and classify the event as a non-event in the future.

In various embodiments, drive event detector 104 is configured to score how risky a captured drive operation, drive maneuver, and/or drive event is by, for example, assigning a numerical value that reflects its riskiness. Scoring of a drive event may be based on driving environment context sensitivity criteria. The driving environment context may be defined by various environmental parameters such as geolocation (e.g., as defined by a set of longitude, latitude, and/or altitude coordinates, or geo-fenced zone). A geo-fenced zone is a geographical area defined by a geo-boundary. For example, a geo-fenced zone comprises a work site (e.g., a construction site), a parking lot, a school zone, a bad neighborhood in a city, a whole town/city/county/etc., an area surrounding the driver's house, etc. In some embodiments, a different scoring criterion may be used for driving in a neighborhood geo-fenced zone or accident prone geo-fenced zone. For example, a school zone, a parking lot, or a construction zones (e.g., a building construction zone or a roadway construction zone) necessitates extra care while driving—for example, slower speeds, slower maneuvering when passing, stopping, or starting, etc., and so the scoring for violations are harsher in these geolocations. The analysis results may be stored in the data storage.

In various embodiments, drive event detector 104 is configured to upload the drive event data (e.g., sensor data and/or analysis data) to remote server 112 that is communicatively linked to the drive event detector for analysis, processing, and/or storage. Uploading can be carried automatically by drive event detector 104 based on predefined criteria or upon requests by, for example, remote server 112. In some embodiments, server 112 performs more detailed and/or additional analysis of the drive event data. For example, the server may use the drive event data to identify the driver, differentiate valid drive events from non-events (e.g., via human review or automated computer review), determine driver attitude (e.g., recklessness) and skill, calculate driver risk score, generate driver profile, identifying dangerous and erratic driving behavior, identifying driver deviation from his/her normal driving behavior (by comparing with his/her drive profile), etc., identifying high risk driver, perform risk analysis for a group of drivers or for an entire fleet, calculating insurance, and/or generate various reports. In various embodiments, a drive profile of a driver includes one or more driving characteristics and patterns of the driver. It may include for example normal routes of the driver, average speed of the driver at a particular location, acceleration characteristics, deceleration characteristics, and launching vehicle from stop characteristics. In various embodiments, a driver profile of a driver includes the results of analysis regarding distance traveled by the driver, a vehicle, a fleet, a frequency and severity of driving events based on the distance traveled, patterns related to time of day and/or day of week (e.g., an increased likelihood for certain risky behaviors at certain times of day or on certain days), a correlation between weather and risky driving patterns, risky intersections/roads/neighborhoods, etc., or any other appropriate results from analysis.

Figure 2:
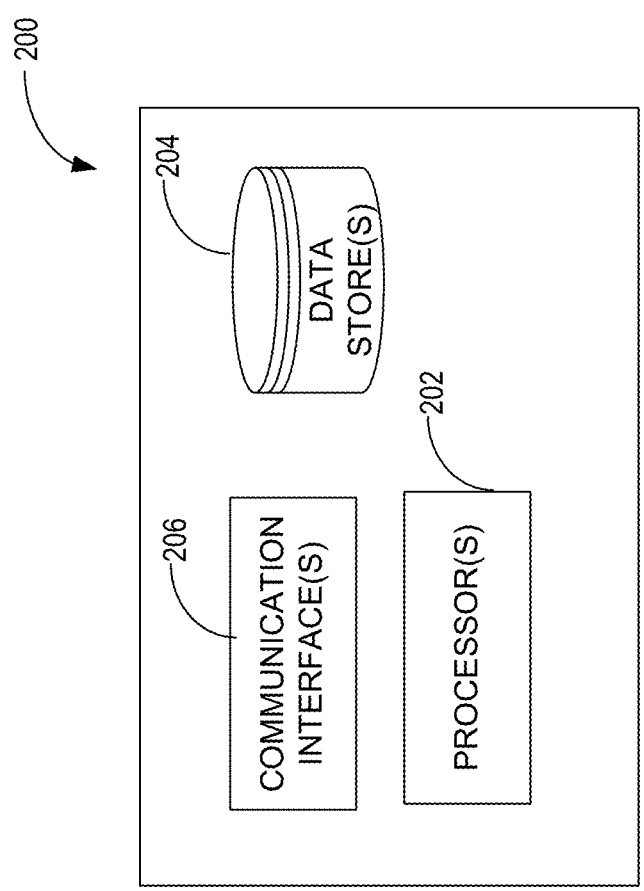
FIG. 2 is a block diagram illustrating an embodiment of a drive event detector.

FIG. 2 is a block diagram illustrating an embodiment of a drive event detector. In some embodiments, drive event detector 200 is used to implement drive event detector 104 of FIG. 1. In the example shown, drive event detector 200 includes one or more computer processors 202 that are capable of executing computer instructions for carrying out various functions of the drive event detector 200. It additionally includes one or more data stores 204 for storing computer instructions, raw sensor data, derived sensor data (metadata), and/or other drive event related data. The drive event detector 200 further includes one or more communication interfaces 206 for communicating with the one or more onboard sensors. Drive event detector 200 is further communicatively linked to a remote server sitting on a data network and configured to receive and/or transmit data from the server.

Figure 3:
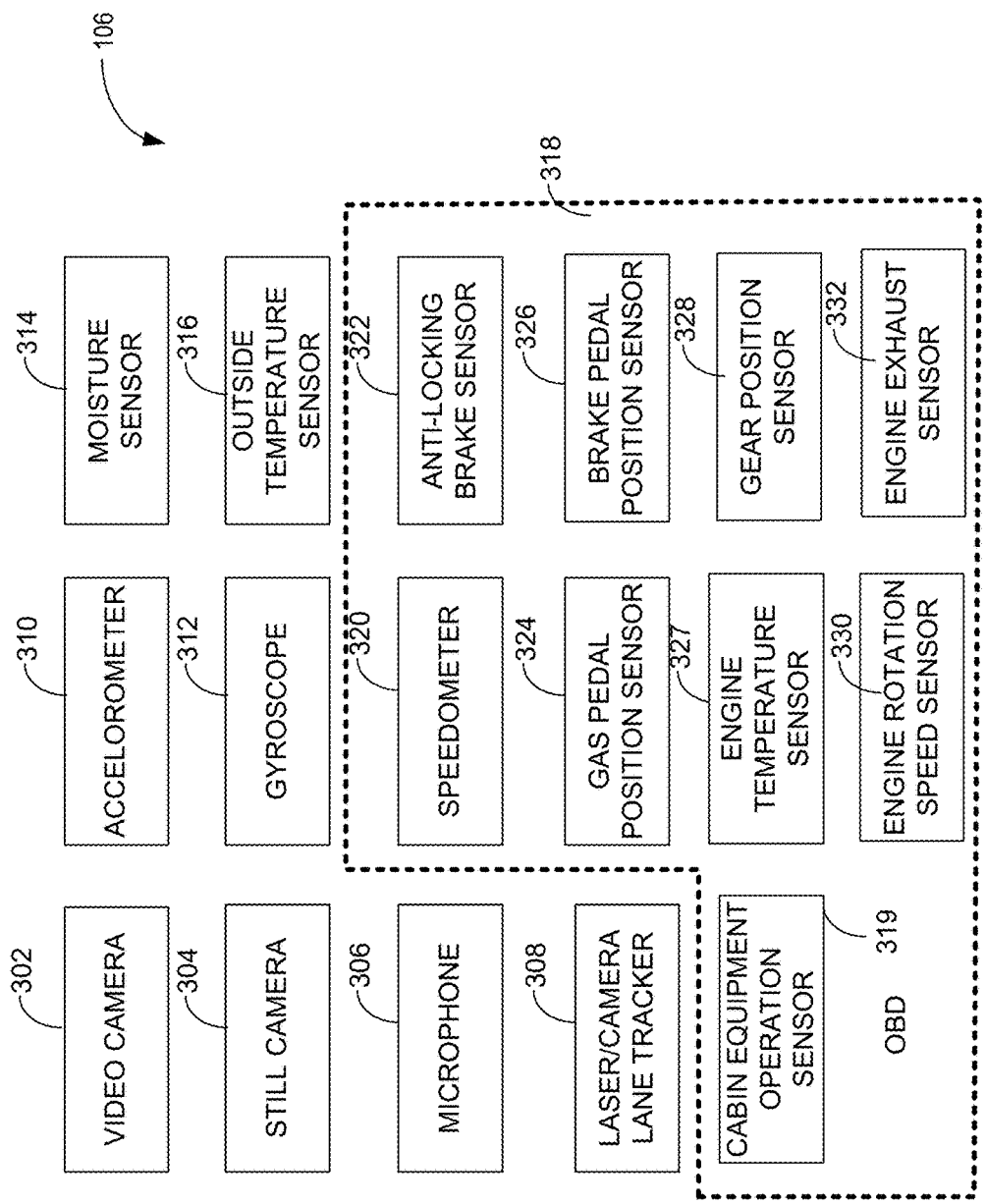
FIG. 3 is a block diagram illustrating an embodiment of onboard sensors that are communicatively linked to a drive event detector.

FIG. 3 is a block diagram illustrating an embodiment of onboard sensors that are communicatively linked to a drive event detector. In some embodiments, an onboard sensor of FIG. 3 comprises one sensor of onboard sensors 106 of FIG. 1. In the example shown, an onboard sensor comprises one or more video cameras 302 and/or still cameras 304 (e.g., image capturing devices), which are mounted at various positions on the vehicle to capture inside cabin view and outside cabin front view, rear view, left side view, and/or right side view video images and/or still images. In some embodiments, video cameras 302 and/or still cameras 304 are equipped with infrared emitters for improved night vision and/or for imaging driver facial features through dark sun glasses. In various embodiments, video cameras 302 and/or still cameras 304 are stereo video cameras and/or still cameras that are capable of capturing 3-D images. In various embodiments, the captured images by video cameras 302 or still cameras 304 are used to identify the driver, record driver behavior and circumstances leading up to, during, and immediately after a drive event, or any other appropriate function(s). In various embodiments, the captured images are used to recognize road signs such as posted speed limit signs, number of lanes, stop signals, traffic signals, and intersections.

In some embodiments, the onboard sensors comprise one or more of the following: a global positioning system receiver, a vehicle operation state sensor, a speedometer, an accelerometer, and a gyroscope.

Onboard sensors include one or more microphones 306, which are placed inside and/or outside the cabin to record audio sounds. Onboard sensors include one or more laser and/or camera based lane tracking sensor 308, which is positioned in the front and/or at the back of the vehicle to track drifting of the vehicle in lane. In one example, video camera 302 is mounted in the overhead console above the mirror to track the lane markings on the roadway. The captured video images are processed using one or more processors to determine whether the vehicle has departed from its proper lane and by how much.

Onboard sensors include accelerometer 310. Accelerometer 310 is placed onboard the vehicle to monitor acceleration along a vehicle axis. The axes of vehicle acceleration include the longitudinal vehicle axis—the axis substantially in the direction of the vehicle's principal motion, the traverse (e.g., lateral) vehicle axis—the substantially horizontal axis substantially orthogonal to the vehicle's principle motion, and the vertical vehicle axis—the axis orthogonal to both the longitudinal vehicle axis and the traverse vehicle axis. In various embodiments, accelerometer 310 comprises a built-in accelerometer put in place by the vehicle manufacturer or an add-on accelerometer added after manufacturing.

Onboard sensors comprise gyroscope 312. Gyroscope 312 detects an angular rate of vehicle rotation and/or how quickly the vehicle turns. The rotation is typically measured in reference to one of three axes: yaw, pitch and roll.

Onboard sensors comprise moisture sensor 314 and temperature sensor 316. Moisture sensor 314 is mounted on the outside of the vehicle to detect environmental moisture level, which provides an indication whether it is raining on the road. Temperature sensor 316 is mounted on the outside of the vehicle to detect environmental temperature, which provides information as to how cold the outside environment is and whether it is below freezing and by how much.

In some embodiments, a drive event detector has the capability to access information detected by one or more vehicle sensors built in the vehicle by the manufacturer via a vehicle bus interface such as OBD interface 318. For example, via the OBD interface, the drive event detector can access manufacturer built-in speedometer 320 for detecting vehicle speed, anti-lock brake system speed sensor 322 for detecting the rate at which the vehicle wheels are moving and whether the anti-locking braking system has been engaged, gas pedal position sensor 324 and brake pedal position sensor 326 for detecting the gas pedal and brake pedal depression degrees and profiles (e.g., brake pedal and gas pedal depression degrees can be used to develop a profile of a drivers braking and accelerating behavior, once identified, deviations from normative behavior can be detected), engine temperature sensor 326 for sensing engine temperature, gear position sensor 328 for sensing gear position/selection, engine rotation speed sensor 330 for sensing the engine rotation speed, and engine exhaust sensor 332 for sensing composition and temperature of engine exhaust.

In various embodiments, onboard vehicle sensors comprise one or more of the following: a shock sensor, a cabin equipment operation sensor (e.g., a windshield wiper sensor, a state of light sensor—for example, light on detection, light off detection, fog light state sensor, etc.), a radio state sensor, a built-in cellular phone state sensor, a DVD player sensor, a volume sensor for car audio equipment, a sensor for the identity of the driver based on the entry of an identification number, a seat setting sensor, a weight sensor, a status of seat belt sensors, a number of passenger sensor, a distance sensor (e.g., distance to a vehicle in front of, behind, or to the side of the vehicle), or any other appropriate sensor.

Figure 4:
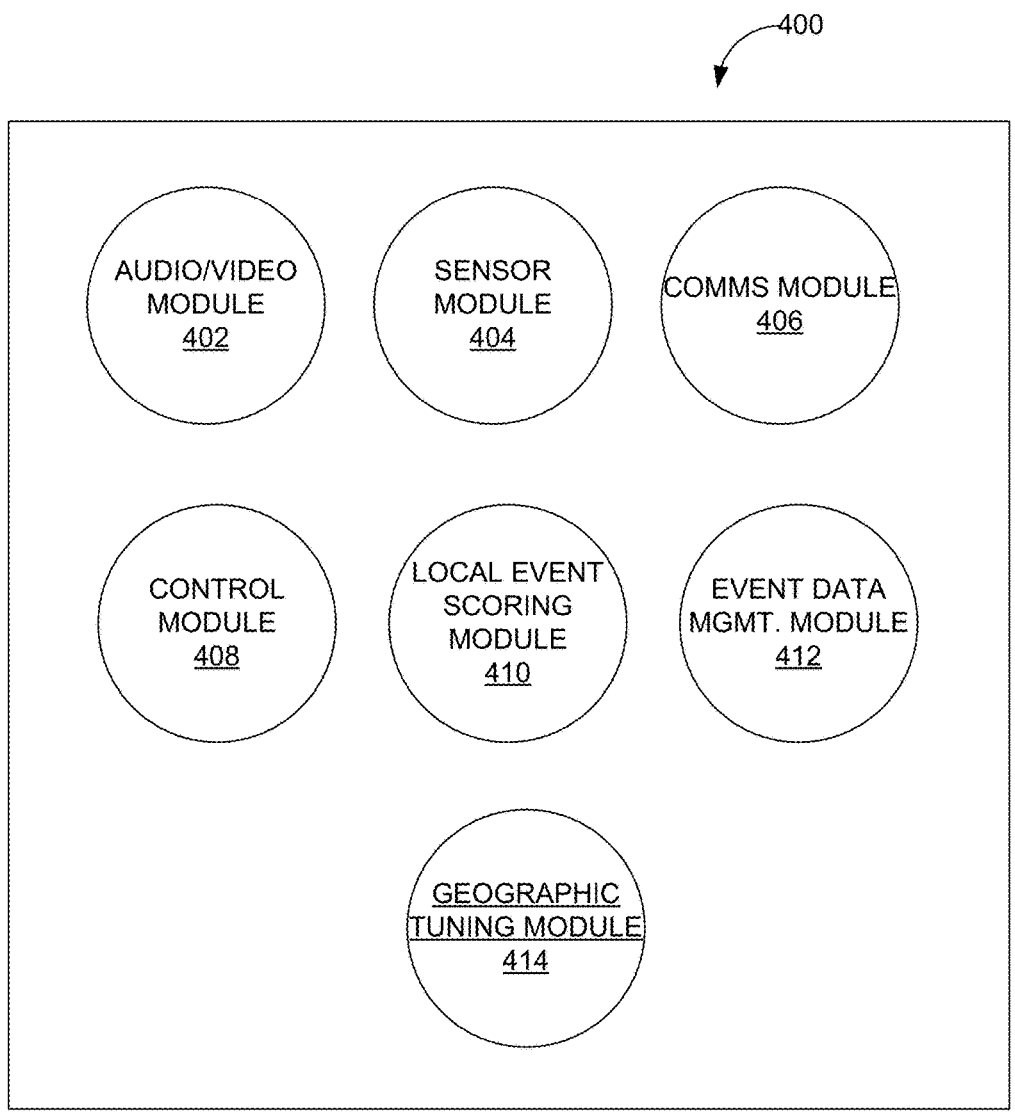
FIG. 4 is a block diagram illustrating an embodiment of an event detector.

FIG. 4 is a block diagram illustrating an embodiment of an event detector. In some embodiments, the event detector of FIG. 4 comprises event detector 104 of FIG. 1. In the example shown, event detector 400 comprises audio/video module 402, sensor module 404, comms module 406, control module 408, local event storing module 410, event data management module 412, geographic tuning module 414. In some embodiments, event detector 400 includes a spatial behavior module (not shown in FIG. 4). Additional modules may also be employed to carry out the various functions of the event detector 400, as will be understood by those having skill in the art.

Audio/video module 402 is configured to manage the audio and video input from one or more image capturing devices (onboard sensors that capture images such as video or still cameras) and storage of the audio and video input. Sensor module 404 is configured to manage one or more sensors (other than image capturing devices) that are integral to event detector 400 or external from the event detector 400. For example, an accelerometer is managed by sensor module 404, which is either integral to event detector 400 or located elsewhere in the vehicle. In various embodiments, sensor module 404 manages any, some, or all of onboard sensors onboard, directly connected, or connected via the OBD bus, or any other appropriate sensors.

Communication module 406 is configured to handle communications between the event detector 400 and other devices and modules. For example, the communication module 406 handles communications between event detector 400 and the various image capture devices. Communication module 406 also handles communications between event detector 400 and a memory device, a docking station, or a server (e.g., an evaluation server). In various embodiments, communication module 406 is configured to communicate with these various types of devices and other types of devices by interfacing via a direct wire link (e.g., universal serial bus (USB) cable, Firewire™ cable, etc.), a direct wireless link (e.g., infrared, Bluetooth, ZigBee), or a wired or any wireless network link such as a local area network ("LAN"), a wide area network ("WAN"), a wireless wide area network ("WWAN"), an IEEE 802 wireless network such as an IEEE 802.16 ("WiFi") network, a WiMAX network, satellite network, a cellular network, or any other appropriate communication network. The particular communications mode used will determine which, if any, antennae is used.

Control module 408 is configured to control the actions of remote devices such as the one or more image capture devices. For example, control module 408 is configured to instruct the image capture devices to capture an event and return the data to the event detector when it is informed by sensor module 404 that certain trigger criteria have been met that identify an event.

In various embodiments, functionality is divided differently among the modules with some of the modules being merged with each other or with different segmentation of task allocated, or any other appropriate implementation of hardware or software configuration used. For example, all or some of the functionality described is integrated into control module 408.

Geographic Tuning Module 414 uses the geographic location of the vehicle (e.g., as determined by onboard GPS or using other locating means) to adjust the response of event detector 400 in a variety of ways—for example, by down grading or up grading the responsiveness of the system based on the geography (e.g., a difficult turn, a flat area with good visibility, a steep road, etc.). For example, the system 400 reacts, or responds, differently within a parking garage than it does on a highway. Within a parking garage, the vehicle is expected to be driving slowly, yet taking a multitude of sharp turns. This is most likely risky driving behavior on the open road, but is totally safe and normal within the confines of the parking garage. The inverse is also true—if a driver is driving a vehicle in a particularly hazardous area, normal driving techniques are considered to be unsafe or high-risk. In both the scenarios, Geographic Tuning Module 414 adjusts event detector 400 and the content of the data that it uploads, so that event records are customized for the particular geography within which the vehicle is being operated.

Local Event Scoring Module 410 reviews the raw data streams from the individual sensors or sensor module 404 and uses one or more mathematic algorithms to calculate a local event score. While this local event score is not expected to be as robust or potentially accurate as the remote event scoring system of a remote server, it is not necessarily a requirement that this be the case, because a remote score may still be determined independent of the local score. One advantage for calculating the local event score is to enable event detector 400 to optimize the use of the data transfer bandwidth by only selectively uploading the full event data to the remote server for review/display/analysis. Through extensive observation, the values produced by the various sensors (either alone or in combination) can be analyzed mathematically to produce a product that accurately predicts whether or not a serious accident or other driving event has occurred. Combinations of acceleration, velocity, video, and event sound can reliably detect that an accident has happened.

If local event scoring module 410 determines that the local event score of a particular driving event meets predetermined criteria, it will direct Event Data Management Module 412 to upload the appropriate data received from the sensors and stored locally within the vehicle (e.g., within a storage device associated with event detector 400).

In some embodiments, Event Data Management Module 412 is responsive to a remote request for additional data. For example, in circumstances where a remote user (e.g., remote to the vehicle being monitored) indicates that an incident is an incident of particular interest, that remote user is able to manually request audio, video, or other locally-recorded data. This requested data would then be transmitted (via communications module 406) to the remote user for review/analysis/display.

In some embodiments, event detector 400 has the ability to reduce, or at least regulate, the amount of data that flows from it to the remote server and/or user(s). For example, large bandwidth data streams such as video and audio data are not regularly transmitted to the remote server unless by direction of either Local Event Scoring Module 412 or by manual or remote user request. This regulation of flow translates into significant cost savings, since most of these systems utilize expensive cellular telephone or satellite networks for vehicle-to-remote server communications.

Figure 5:
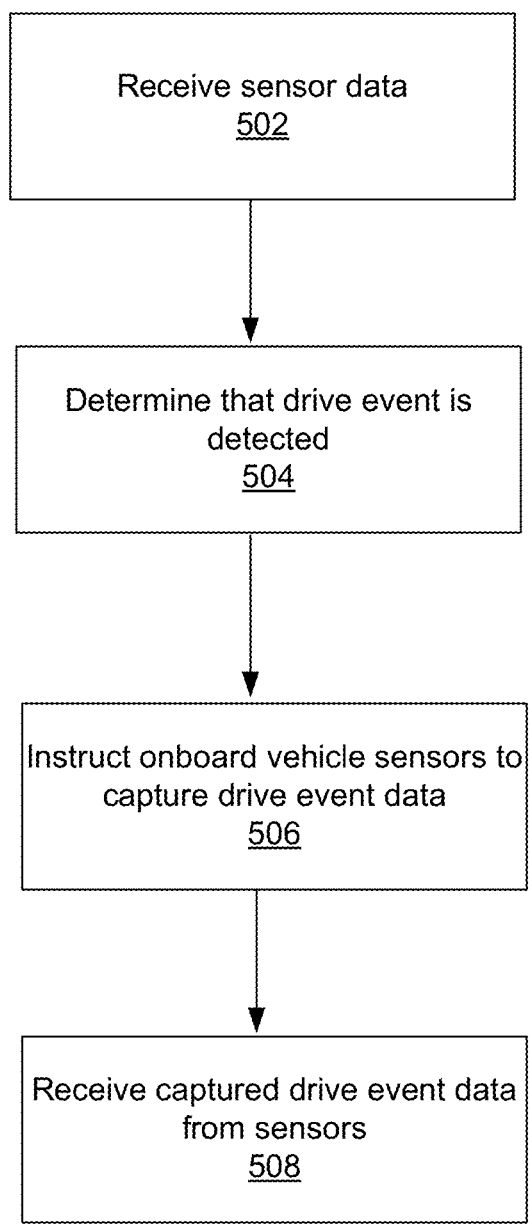
FIG. 5 is a block diagram illustrating an embodiment of a process for capturing drive event data.

FIG. 5 is a block diagram illustrating an embodiment of a process for capturing drive event data. In some embodiments, the process is performed by an onboard computing device (e.g., drive event detector) in cooperation with onboard vehicle sensors. In the example shown, driving events are occurrences and/or behaviors relating to the safe and sound operation of vehicles. In various embodiments, events comprise accidents, near-accidents, traffic law violations, company rule violations, driving occurrences or behaviors that increase the risk of accidents or otherwise poses risk or financial difficulty to the owner of the vehicle or the driver's employer, driving occurrences or behaviors that reflect the attitude (e.g., recklessness), driving skill, or otherwise have a bearing on evaluating the driving performance of the driver, or any other appropriate events.

In 502, sensor data is received. For example, streams of sensor data are received from one or more individual onboard vehicle sensors. In various embodiments, the sensor data includes raw sensor data and/or processed sensor data (e.g., filtered using a low-pass filter). In various embodiments, the sensors transmit the sensor data automatically or upon request (e.g., from a drive event detector). In various embodiments, the sensor sensitivity is adjusted based on the geolocation of the moving vehicle.

In 504, it is determined that a drive event is detected. For example, the received data from the sensors is analyzed to determine whether the data is of interest, belongs to an event (e.g., there is a triggering signal or there are a combination of signals that exceed a threshold or fulfill one or more conditions that indicate an event has likely occurred), is a non-event (e.g., matches a non-event profile—for example, where the non-event profile includes a geolocation based pothole profile, speed bump profile, bumpy road profile, is an event that has previously occurred, is an uninteresting event, is an interesting event, is a likely interesting event, or is indeterminate. In some embodiments, the determination that a drive event has occurred can be made based on one or more predefined criteria such as one or more sensor data values exceeding predefined threshold values (e.g., a vehicle speed threshold, a vehicle acceleration threshold, a vehicle deceleration threshold, etc.) or match predefined profiles. A statistical similarity may be calculated for the driving data and the predefined profiles, if the statistical similarity is sufficient, a match is found. For example, a potential collision drive event is determined to be detected when a sudden deceleration is sensed by an onboard accelerometer signal exceeds a predefined value or matches a predefined profile (e.g., a large spike signal following a smaller spike). In some embodiments, the criteria for detecting drive events are adjusted based on the geolocation of the moving vehicle.

In various embodiments, a score is calculated based on the received sensor data and a determination that a potential drive event or actual drive event has started or has occurred is made based on the calculated score. A score can be calculated based on the output of a trained machine learning algorithm and the profile of similar events that have received similar output. For example, if a particular maneuver at a particular location is classified as a driving event by the machine learning algorithm a post-processing model can compare the output to previous outputs and determine the frequency (number of events that have a similar output) and severity of the previous events and score the current event accordingly. Subsequently, if the drive event score is above a predefined threshold, it is determined that a drive event or potential drive event has occurred. In various embodiments, the criteria used to calculate the score is adjusted based on the geolocation of the moving vehicle. For example, driving at a moderate speed when wet conditions are detected is given higher risk score than the same driving when the conditions are not wet. In various embodiments, one or more algorithms are used by a local event detector to calculate a local event data score. For example, if the driving speed is higher than the posted speed limit for the particular road, then the score differs if the posted speed limit was exceeded by more than 10 mph vs. more than 20 mph. Or, for example, the score differs based on the sensitivity of the area (e.g., exceeding by 10 miles per hour or more in a school zone vs. on a freeway). Another example is score may be higher if the driver has passengers in the vehicle, or if the accelerometer and/or gyroscope reading is only slightly higher vs. significantly higher than thresholds. If the profile is of an accident, it may have a higher score than if the profile is of a lane change without accident. Combinations of or certain combinations of risky behaviors may increase the score, such as driving without seatbelt while speeding vs. just speeding. In various embodiments, the algorithms used may not be as robust or accurate as an event scoring system used by a remote server and thus does not require as much computation power as that used by the remote server. This can be an advantage since a smaller computing device can be used onboard the vehicle to calculate a drive event score in real time. This allows the processing of driving data onboard the vehicle to be focused on the portion of the processing that can efficiently dealt with by local processing power—for example, minimizing data handling, data storage, and data transmission. In some embodiments, a score calculation provides a risk probability score (e.g., combination of frequency and severity) on each driving event to build profiles of risk based on historical analysis of events (e.g., leveraging model based computation and our human reviews). In some embodiments, the score calculation comprises a learning system that automatically improves as the score profiles are rebuilt nightly based on new information derived from human reviews of events. In some embodiments, by leveraging advanced statistical algorithms and human review, risky drivers/vehicles are predicted. In some embodiments, the system compares drivers, vehicles, groups, companies, or industries using a normalized scale.

In various embodiments, detecting a drive event or potential drive event involves detecting a start of the drive event or potential drive event based on one or more predefined criteria such as one or more sensor data values exceeding predefined threshold values or matching predefined drive event profiles (e.g., a number of sensor values falling within a number of predefined ranges). In various embodiments, detecting a drive event or potential drive event involves detecting an end of the drive event or potential drive event based on one or more predefined criteria such as one or more sensor data values falling below predefined threshold values or matching predefined post-drive-event profiles (e.g., a number of sensor values falling within a number of predefined ranges after having been with in the drive event/potential drive event ranges). In some embodiments, matching drive event profiles comprises using information such as having a vehicle move into or out of a particular geolocation or changing weather conditions.

In 506, onboard vehicle sensors are instructed to capture drive event data. For example, data related to the drive event or potential drive event is captured from the onboard vehicle sensors after determining that the drive event or potential drive event has been detected. In some embodiments, capturing drive event data comprises instructing one or more sensors to capture certain amount of pre-event data, during-event data, and post-event data. In various embodiments, the pre-event driving data only include data prior to a detected start of the drive event, the during-event driving data only include driving data from a detected start of the drive event to a detected stop of the drive event, and the post-event data includes only the driving data after a detected stop of the drive event. The capture of pre-event data is enabled by the use of memory buffers that continuously save sensor data in a continuous loop. In various embodiments, capturing the event data includes instructing the sensors to save data stored in one or more sensor memory buffers to a persistent storage. The capturing of pre-event, during-event, and post-event data allows the circumstances leading up to the drive event (e.g., accident), during the drive event, and after the drive event to be documented.

In 508, the captured drive event data is received from one or more onboard vehicle sensors. For example, the captured data of the event (e.g., a portion of pre-event sensor or driving data, a portion of during-event sensor or driving data, and a portion of post-event sensor or driving data) are transferred from the sensor to the event detector so that the entire event data can be packaged, stored, and/or transmitted to a remote server.

In various embodiments, the captured drive event data includes still images and/or video images that show driver behavior, road condition, and/or adjacent vehicle behavior just prior to, during, and post the drive event, or any other appropriate drive event data. In some embodiments, the captured drive event data includes audio signals related to the drive event. In some embodiments, the captured drive event data includes geolocation tracking of the moving vehicle during and around the occurrence of the drive event. In various embodiments, the captured drive event data tracks the operational state of the moving vehicle related to the drive event, including for example vehicle direction, speed, acceleration (e.g., overall acceleration, longitudinal acceleration, lateral acceleration), deceleration (e.g., overall deceleration, longitudinal deceleration, lateral deceleration), rotation, engine speed, brake pedal position, gas pedal position, gear position, equipment use, or any other appropriate state data. In various embodiments, the drive event data which includes data from one or more sensors are saved to a single record, file, folder, directory, or otherwise organized in such a way that they can be easily identified as drive event data belonging to a particular drive event separate from other information. In various embodiments, the event data from different sensors are time-synchronized or correlated by for example the drive event detector.

Figure 6:
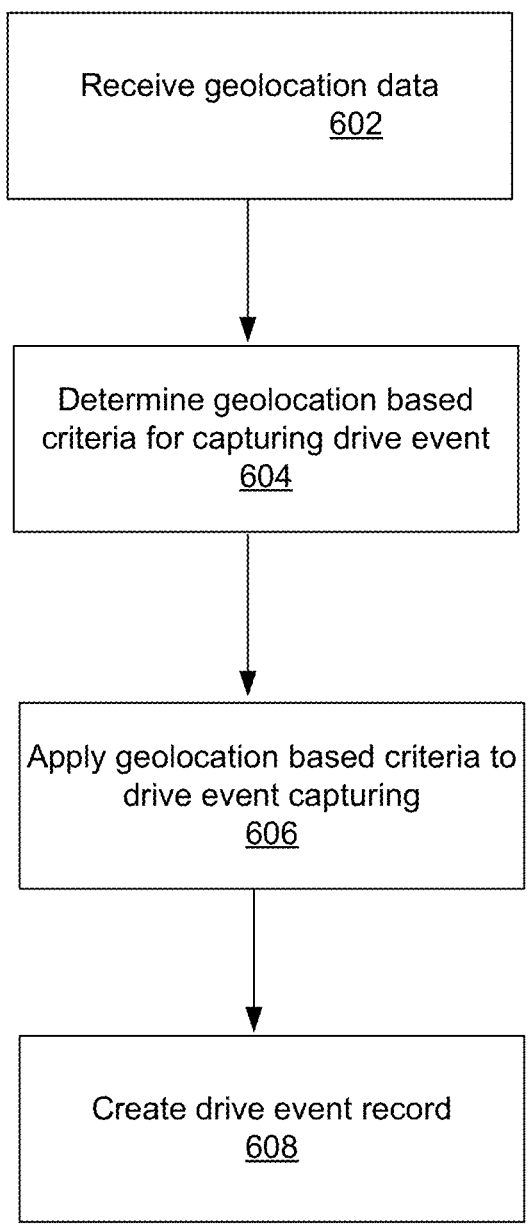
FIG. 6 is a block diagram illustrating an embodiment of a process for applying geolocation based criteria for capturing drive events of a moving vehicle.

FIG. 6 is a block diagram illustrating an embodiment of a process for applying geolocation based criteria for capturing drive events of a moving vehicle. In some embodiments, the process of FIG. 6 is performed by an onboard computing device (e.g., onboard drive event detector) in cooperation with the onboard vehicle sensors. In the example shown, in 602, geolocation data is received. For example, a real-time geolocation data of the moving vehicle is received (e.g., GPS data) and used to determine the location of the vehicle with respect to a previous location, an on board map, or a next location, or a destination. In some embodiments, the geolocation data includes GPS data received from a plurality of satellite using a GPS receiver onboard the vehicle. In some embodiments, the geolocation data identifies or enables the calculation of the geographic coordinates of the moving vehicle, such as longitude, latitude and altitude of the moving vehicle. In some embodiments, the geolocation data are data used to determine a geo-fenced zone within which the moving vehicle is located. In some embodiments, the geolocation data track the trajectory of the moving vehicle over time. In some embodiments, the GPS location data identifies the orientation of the vehicle and the direction the vehicle is traveling. For example, the moving vehicle can be identified traveling north bound on a particular highway.

Geo-fenced zones are areas defined by geo-boundaries. They can be defined based on various driving conditions such as road condition, weather condition, and traffic condition. The geo-fenced zone can be determined from a digital map and the geographic coordinates of the vehicle. The geo-fenced zone can be statically defined based on static driving conditions or dynamically defined based on dynamic driving conditions. Example geo-fenced zones include school zones, a construction zones, and/or hazardous weather zones. In various embodiments, the geo-fenced zones are time sensitive and can be activated or de-activated at different time or different day (e.g., between 8 AM and 5 PM, or only on Mondays through Fridays, or a combination of a time and day). In various embodiments, a geo-fenced zone is activated when a vehicle is within the zone or when a vehicle is outside the zone. In various embodiments, adjusting sensor sensitivity includes adjusting a threshold level of one or more sensors based on the geolocation of the vehicle. In various embodiments, adjusting sensor sensitivity includes adjusting a sensor cut-off filter frequency based on the geolocation of the vehicle.

In 604, the geolocation based criteria for capturing drive event are determined based on the geolocation. In various embodiments, this involves looking up a database that has stored criteria for capturing drive events based on geolocation criteria, geolocations, or geo-fenced zones. In some embodiments, the database includes a digital map such as a digital safety map. In some embodiments, the digital map includes various geo-fenced zones. In some embodiments, the database refers to or shares a digital map that is stored on the moving vehicle for another application. In some embodiments, the database digital map is adapted to the driving routes of the moving vehicle so that a smaller digital map and associated driver event criteria that focus on the frequent driving routes of the moving vehicle is used for capturing drive events of the moving vehicle.

In various embodiments, the geolocation based criteria reflects the effect of geolocation on whether a particular set of sensor data detected during vehicle operation represent a true drive event of interest. By adjusting the criteria for capturing drive event based on geolocation, one can potentially minimize capturing false positive drive events and/or ensure all valid drive events are captured. For example, in the case of geolocation with a known speed bump—if the driving profile at that location matches a vehicle going over a speed bump, then don't capture the event or mark it as a non-event; if the driving profile doesn't match the speed bump, then mark it as interesting event. In various embodiments, similar to speed bumps, potholes, railroad tracks, dips in the road, paved vs. unpaved (e.g., bumpy) road, etc. are handled in a similar manner to determine whether a set of circumstances is marked as an event or a non-event. In various embodiments, the geolocation based criteria includes one or more geolocation based onboard sensor threshold values for detecting an event from driving data. For example, a deceleration threshold for detecting a collision drive event is set higher for a bumpy road (e.g., a road filled with potholes), since a bumpy road would cause more erratic decelerations than decelerations that occur when driving on a well-paved neighborhood street. In some embodiments, the geolocation based criteria for capturing drive event include one or more criteria for detecting a drive event or potential drive event based on sensor data. For example, a drive event profile that is geolocation based can be used to determine whether a set of sensor data represent drive event or potential drive event. For example, if the geo-location of a stop sign is known, the speed of the vehicle approaching the stop sign can be used to identify failure to stop at the stop sign and thus identify a driving event. In some embodiments, the geolocation based criteria for capturing a drive event includes one or more criteria for rejecting a detected potential drive event to be non-event or invalid drive event. For example, a non-event profile that is geolocation based can be used to reject detected potential drive event as non-event. In some embodiments, the geolocation based criteria for capturing drive event includes criteria for selectively storing drive event. For example, geolocation based criteria can be used to determine whether to upload sensor data from stored in a flush memory to a persistent storage. In some embodiments, the geolocation based criteria can be used to determine whether to and/or in what kind of form or detail to upload sensor data to a remote server. In some embodiments, captured drive event data is uploaded to a persistent storage (e.g., a storage drive associated with a remote server) from a volatile memory buffer (e.g., a continuous storage buffer for data). In various embodiments, a geolocation makes an event detector less sensitive when a) a vehicle is in the company yard (e.g., where a bus parks every night); b) the vehicle is at a job site (e.g., a concrete vehicle at a job site with known rough or uneven roads, or any other appropriate geolocation making an event detector less sensitive. In various embodiments, a geolocation makes an event detector more sensitive when a) the vehicle triggers an event in a known, risky intersection (e.g., an intersection identified by seeing clustering of collisions); b) the vehicle is on an unknown or unmarked road, or any other appropriate geolocation making an event detector more sensitive.

In 606, the geolocation based criteria are applied for capturing drive events of the moving vehicle. In some embodiments, this involves adjusting one or more sensors' sensitivities based on the geolocation of the vehicle. The idea is that driving in different environments requires different maneuvering styles. For example, it is normal for drivers to make a series of turns interconnected by short stretches of driving straight in a parking garage. If the drive event capture criteria are based on sharpness and frequencies of turns and if the same criteria are used for driving in the parking garage as for driving on the highway, the drive event detector may over capture drive events when the vehicle is traveling in the parking garage and under detect drive events when the vehicle is traveling on the highway. To overcome this difficulty, it may be important to adopt a different set of criteria for different driving geolocations. In some embodiments, instructions can be sent to onboard sensors to adjust their sensitivity setting. In some embodiments, the sensor data are filtered using a filter. In some embodiments, adjusting sensor sensitivity based on the geolocation of the vehicle includes adjusting sensor sensitivity based on a current geolocation of the vehicle. In various embodiments, adjusting sensor sensitivity involves adjusting a detection threshold of the sensor, adjusting a gain of the sensor, adjusting an attenuation of the sensor, adjusting a bandwidth of a sensor, or any other appropriate adjustment to a sensor. In some embodiments, adjusting sensor sensitivity based on the geolocation of the vehicle includes adjusting sensor sensitivity to a sensor sensitivity setting associated with the geolocation. The sensor sensitivity setting can, for example, be looked up from a database that associates geolocations with geolocation based sensor sensitivity settings. In some embodiments, the geolocation is defined using a set of geographic coordinates. In some embodiments, the geolocation is defined using a geo-fenced zone within which the vehicle is located. In one example, a minimum accelerometer sensor setting for sensing impacts is adjusted based on geolocation for detecting In some embodiments, geolocation based criteria are applied to detected driving data to determine whether a drive event or potential drive event has occurred. For example, a trigger force threshold for determining that a potential collision has occurred is increased for a geolocation where the road is full of pot-holes or otherwise bumpy. In another example, a different drive event profile for detecting reckless driving is selected for a driving in a parking lot where frequent stops, sharp and frequent turns are safe as opposed to driving on a highway where frequent stops and sharp turns are dangerous. In some embodiments, drive event detection criteria is adjusted based on other parameters such as weather condition, vehicle type, and cargo type in addition to the vehicle's geolocation.

In some embodiments, geolocation based criteria are applied to reject detected drive event as invalid drive event or non-event. A non-event is a captured potential drive event that is later determined to be not a drive event that has any bearing on driver performance evaluation. For example, passing through a speed bump in a parking garage generates a shock force. This will trigger a potential drive event to be captured. However, this is not an actual drive event since it is not of interest and does not have much bearing on the driver's safety performance. Therefore, if such captured drive events can be removed automatically, it will minimize storing, transmitting, reviewing, and/or analyzing unnecessarily data. So, the system is able to match a non-event and eliminate the event before transmitting. In some embodiments, the non-event is not erased but preserved for downloading when the vehicle returns for service or is able to transfer data easily/without substantial cost.

In 608, the drive event record is created. In some embodiments, the drive event is transmitted to a remote server. In some embodiments, a more complete drive event record is created and transmitted to a server if the drive event is determined to be a valid drive event. In some embodiments, an abbreviated drive event record is transmitted to a remote server if the detected drive event is determined to be a non-event. In some embodiments, when the same type of drive event is found to be repeatedly captured at the same geolocation, an avoidance record of the drive event is created on the vehicle and transmitted to a remote server. In some embodiments, the avoidance record is created on the remote server.

Figure 7:
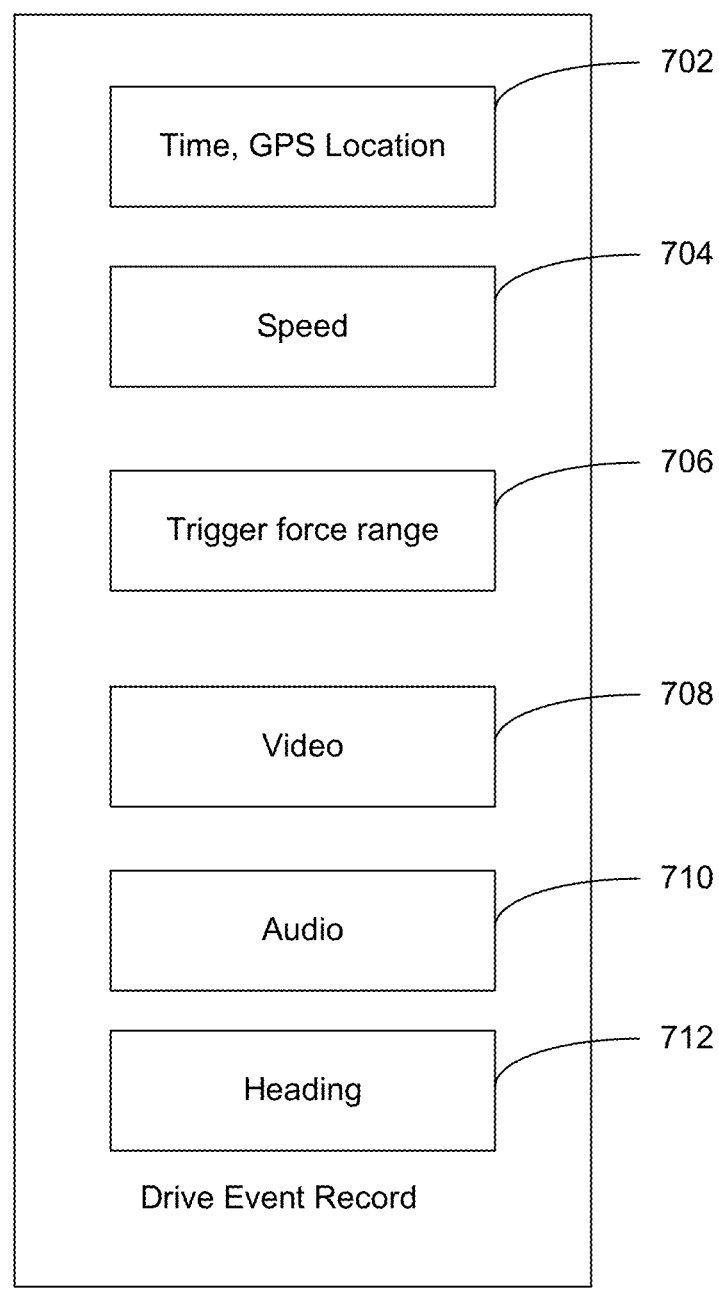
FIG. 7 is a block diagram illustrating an embodiment of a full drive event record.

FIG. 7 is a block diagram illustrating an embodiment of a full drive event record. In the example shown, a full drive event record includes time and GPS location 702 associated with the occurrence of a drive event, speed 704 of the vehicle at the time of the drive event, trigger force range 706 for the drive event, and video data 708 and audio data 710 associated with the drive event. In some embodiments, the trigger force range is calculated from the rate of vehicle deceleration and the weight of the vehicle. FIG. 7 should also include the "heading" (e.g., the direction that the vehicle is traveling). In some embodiments, the heading is derived from GPS data.

Figure 8:
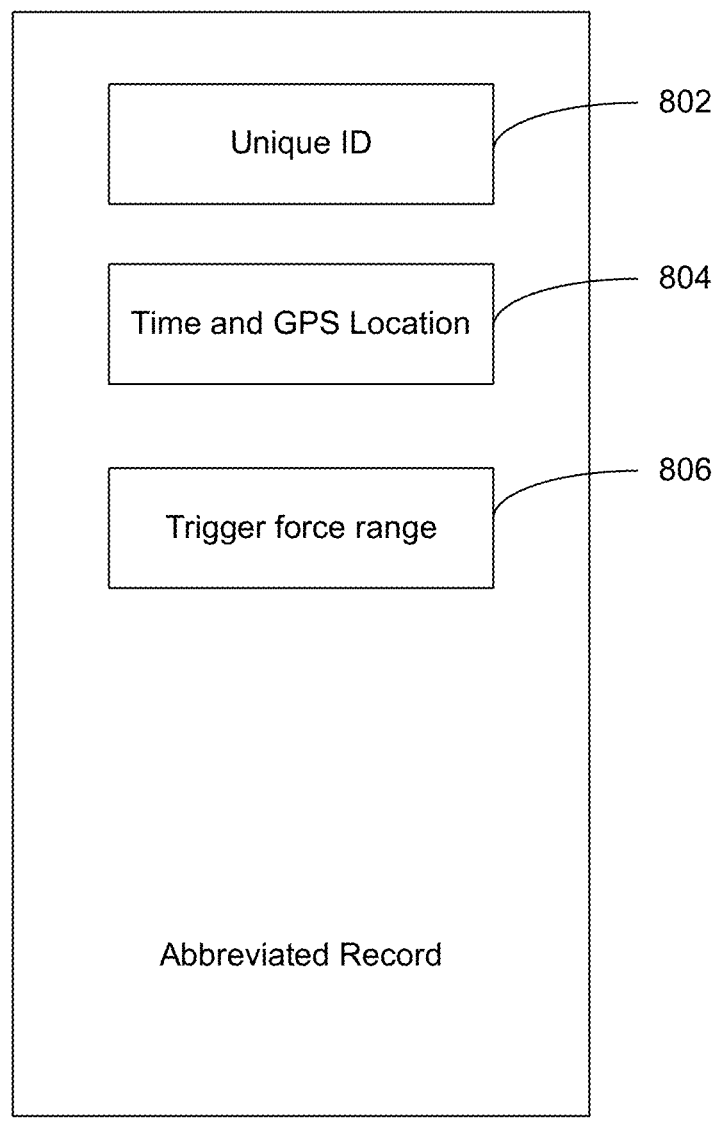
FIG. 8 is a block diagram illustrating an embodiment of an abbreviated drive event record.

FIG. 8 is a block diagram illustrating an embodiment of an abbreviated drive event record. In some embodiments, if a captured drive event matches a non-event profile and is determined to be a non-event, an abbreviated record is created. In the example shown, the abbreviated drive event record includes less information than a full drive event record since detailed information is not needed for a non-event. The abbreviated record includes unique ID 802 that identifies the non-event or the type of non-event, time and GPS location 804 of the non-event, trigger force range 806 of the non-event.

Figure 9:
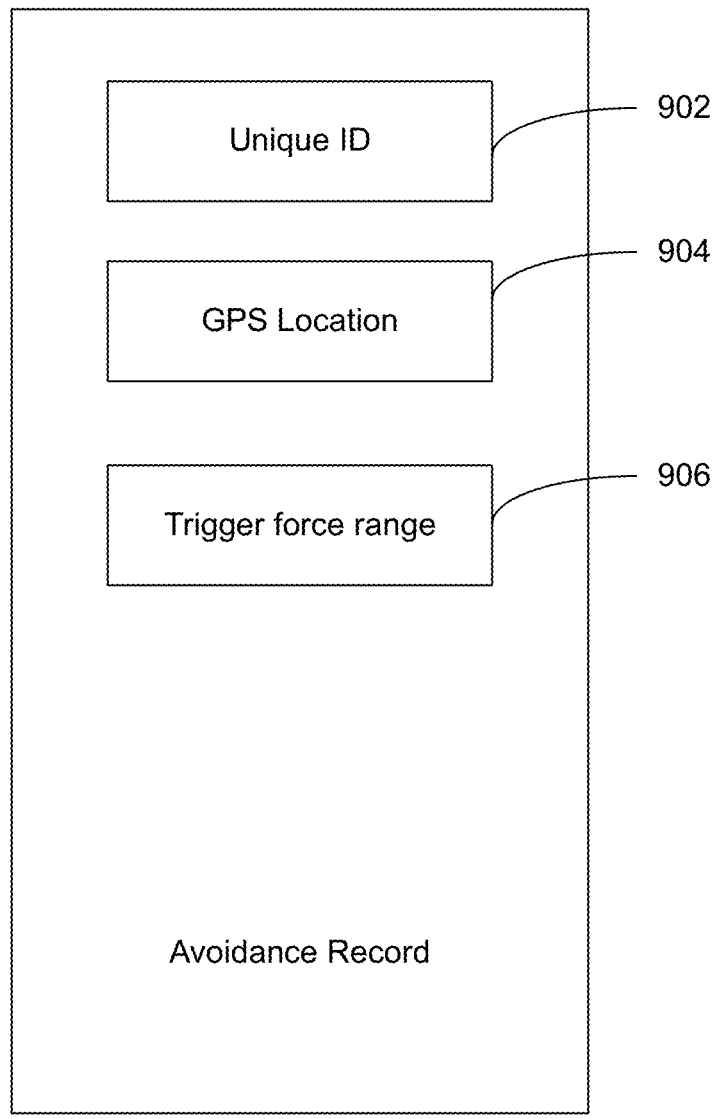
FIG. 9 is a block diagram illustrating an embodiment of an avoidance record.

FIG. 9 is a block diagram illustrating an embodiment of an avoidance record. In some embodiments, a particular type of drive event has a corresponding non-event profile created and the particular type of drive events have been captured for a predefined number of times, an avoidance record is created for this type of event. In the example shown, the avoidance record includes less information than the abbreviated record. The purpose of the avoidance record is to enable an alert to be provided to the driver so that the driver is able to avoid a similar event, and thereby minimizing the chance that the event occurs again and is again captured and analyzed in the future. For example, if a driver often goes over a speed bump in such a way that always triggers a drive event to be captured, an avoidance record is created in such a case to alert the driver to adjust his/her driving when going over this speed bump so that no drive event will be captured as a result of passing through the speed bump. The avoidance record includes unique identifier 902 that uniquely identifying the non-event or the type of non-event and its profile, GPS location 904 identifying the geolocation of the event, and trigger force range 906 identifies the trigger force range of the event.

Figure 10:
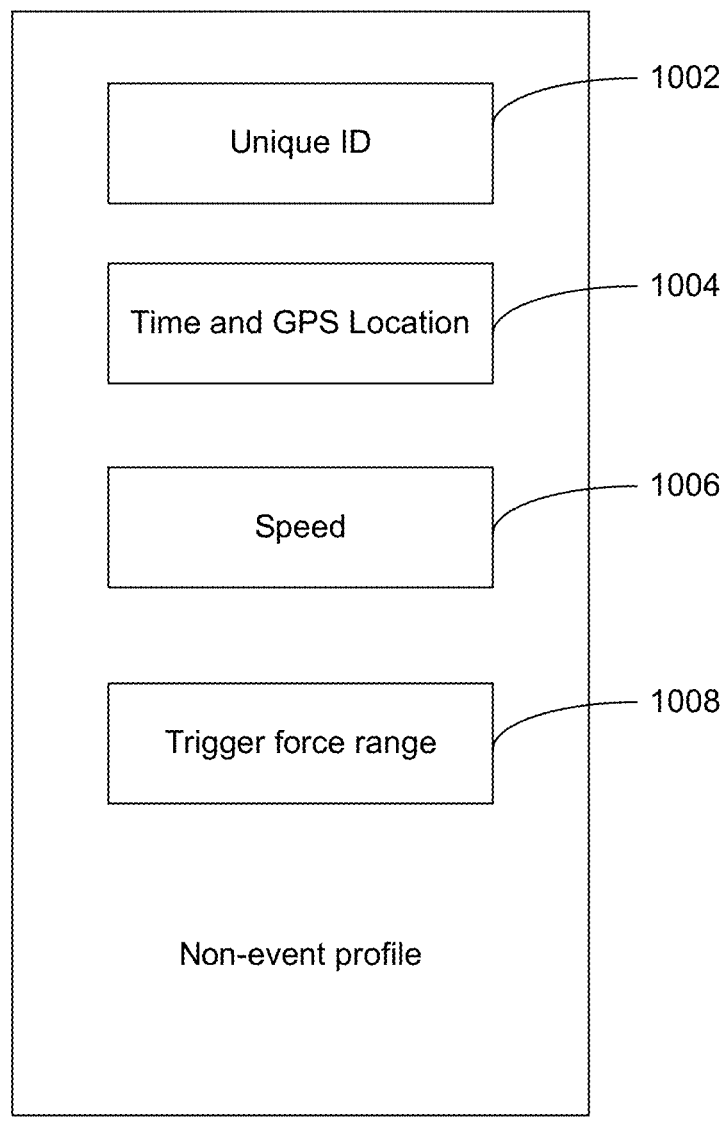
FIG. 10 is a block diagram illustrating an embodiment of a non-event profile.

FIG. 10 is a block diagram illustrating an embodiment of a non-event profile. In the example shown, the non-event profile comprises unique identifier 1002 created by the evaluation server to identify the non-event or the type of non-event, time and GPS location 1004, speed 1006, and trigger force range 108. A type of non-event has associated with it various criteria for determining that a potential drive event is not a drive event or is a non-event. The criteria include time and GPS location criteria 1004, speed 1006 criteria, and trigger force range 1008 criteria for determining that a captured event is a non-event. In various embodiments, the non-event profiles are created locally on a local computing device of the moving vehicle, on a remote server remote to the moving vehicle, or on any other appropriate device, server, or computer. The non-event profile is created based on captured event data for events that are determined to be non-event by an evaluator or operator. For example, an evaluator may look at snapshots of images from the videos at different intervals within the data provided and/or look at a graph of the accelerometer data, listen to the audio, look at the video inside and outside of the vehicle, to determine things like whether the vehicle was following too closely to a vehicle before it, whether a vehicle was too close during lane changes, whether they stopped abruptly due to a child running into the street, whether the driver was looking at the various mirrors in the vehicle, whether the driver was eating/talking on the phone, wearing their uniform, falling asleep, etc. and based on all of this determine a non-event. In various embodiments, the non-event profile is stored on the server and copies of the non-event profile are sent to an event detector onboard a vehicle. The onboard event detectors apply the non-event profile to event data of potential drive events to determine whether the potential drive events are non-events.

In some embodiments, the system described herein for drive event capturing based on geolocation is implemented using a processor without specific modules as described above. For example, various modules are combined or divided as appropriate. In some embodiments, the functionality described is implemented using any appropriate implementation with computer hardware and/or computer software.

In some embodiments, an event does not have associated audio and/or video data that are meaningful (e.g., driving over the speed limit).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for classifying driving data based on geolocation, comprising:
    an interface to receive a driving data from a sensor data device of a vehicle and a geolocation data of the vehicle;
    a processor configured to:
        determine whether the geolocation data corresponds to a geo-fenced zone that includes a geolocation of a stored non-event profile;
        in response to determining that the geolocation data corresponds to the geo-fenced zone that includes the geolocation of the stored non-event profile:
            determine an adjusted sensor sensitivity for capturing driving data that matches the stored non-event profile;
            cause adjusting of a sensor sensitivity of the sensor data device to the adjusted sensor sensitivity;
            receive during-event driving data associated with the geolocation using the adjusted sensor sensitivity;
            receive the stored non-event profile from a data storage;
            determine whether the during-event driving data matches the stored non-event profile;
            in response to the during-event driving data matching the stored non-event profile, assign the during-event driving data as a non-event; and
            in response to the during-event driving data not matching the stored non-event profile, indicate that the during-event driving data comprises an event of interest; and
    a memory coupled to the processor and configured to provide the processor with instructions.

2. The system of claim 1, wherein the driving data comprises data collected from one or more of the following: an image capturing device, a global positioning system (GPS) receiver, a vehicle operation state sensor, a speedometer, or a gyroscope.

3. The system of claim 1, wherein the processor is further configured to receive pre-event driving data associated with the geolocation using the adjusted sensor sensitivity, and post-event driving data associated with the geolocation using the adjusted sensor sensitivity.

4. The system of claim 1, wherein the processor is further configured to determine whether the driving data comprises a drive event based at least in part on a drive event criterion.

5. The system of claim 4, wherein the drive event comprises a vehicle collision drive event.

6. The system of claim 4, wherein the drive event criterion is based at least in part on the geolocation data.

7. The system of claim 4, wherein a deceleration threshold of the drive event criterion is adjusted based at least in part on the geolocation data.

8. The system as in claim 4, wherein the drive event criterion comprises a frequency of stops, a frequency of turns, or a sharpness of turns.

9. The system of claim 1, wherein adjusting the sensor sensitivity of the sensor data device comprises adjusting one or more of the following: a gain of the sensor data device, an attenuation of the sensor data device, a bandwidth of the sensor data device, a detection threshold of the sensor data device, and a sensor cut-off filter frequency of the sensor data device.

10. The system of claim 1, wherein the stored non-event profile comprises a pot-hole profile, a speed bump profile, or a bumpy road profile.

11. The system as in claim 1, wherein the geo-fenced zone is a geographical area on a digital map defined by a geo-boundary.

12. The system of claim 1, wherein the processor is further configured to determine a drive score for the driving data based at least in part on the geolocation data, wherein the drive score comprises an indication of risk.

13. The system of claim 12, wherein the processor is further configured to determine whether the drive score is above a threshold.

14. The system of claim 12, wherein the processor is further configured to upload the driving data from a volatile memory buffer to a persistent storage on a remote server in a level of detail that is based at least in part on the drive score.

15. The system of claim 1, wherein the processor is further configured to upload the driving data from a volatile memory buffer to a persistent storage on a remote server.

16. A method for classifying driving data based on geolocation, comprising:
   receiving a driving data from a sensor data device of a vehicle and a geolocation data of the vehicle;
   determining, using a processor, whether the geolocation data corresponds to a geo-fenced zone that includes a geolocation of a stored non-event profile; and
   in response to determining that the geolocation data corresponds to the geo-fenced zone that includes the geolocation of the stored non-event profile:
      determining an adjusted sensor sensitivity for capturing driving data that matches the stored non-event profile;
      causing adjusting of a sensor sensitivity of the sensor data device to the adjusted sensor sensitivity;
      receiving during-event driving data associated with the geolocation using the adjusted sensor sensitivity;
      receiving the stored non-event profile from a data storage;
      determining whether the during-event driving data matches the stored the non-event profile;
      in response to the during-event driving data matching the stored non-event profile, assigning the during-event driving data as a non-event; and
      in response to the during-event driving data not matching the stored non-event profile, indicating that the during-event driving data comprises an event of interest.

17. A computer program product for classifying driving data based on geolocation, the computer program product being embodied in a non-transitory computer readable storage medium and comprising computer instructions for:
   receiving a driving data from a sensor data device of a vehicle and a geolocation data of the vehicle;
   determining whether the geolocation data corresponds to a geo-fenced zone that includes a geolocation of a stored non-event profile; and
   in response to determining that the geolocation data corresponds to the geo-fenced zone that includes the geolocation of the stored non-event profile:
      determining an adjusted sensor sensitivity for capturing driving data that matches the stored non-event profile;
      causing adjusting of a sensor sensitivity of the sensor data device to the adjusted sensor sensitivity;
      receiving during-event driving data associated with the geolocation using the adjusted sensor sensitivity;
      receiving the stored non-event profile from a data storage;
      determining whether the during-event driving data matches the stored non-event profile; in response to the during-event driving data matching the stored non-event profile, assigning the during-event driving data as a non-event; and
      in response to the during-event driving data not matching the stored non-event profile, indicating that the during-event driving data comprises an event of interest.

* * * * *

UNITED STATES PATENT AND TRADEMARK OFFICE
CERTIFICATE OF CORRECTION

PATENT NO. : 10,445,954 B2
APPLICATION NO. : 15/047498
DATED : October 15, 2019
INVENTOR(S) : Roni Tamari and Joshua Donald Botnen Page 1 of 1

It is certified that error appears in the above-identified patent and that said Letters Patent is hereby corrected as shown below:

In the Drawings

In sheet 3, figure 3, block 310, delete "ACCELOROMETER" and insert --ACCELEROMETER--, therefor.

Signed and Sealed this
Seventh Day of April, 2020

Andrei Iancu
*Director of the United States Patent and Trademark Office*